Feb. 4, 1958 J. F. WOOD 2,822,428

VARIABLE GAP MAGNETIC TAPE HEAD

Filed July 13, 1954

Inventor
John F. Wood
By Alois W. Graf
Attorney 2,822,428

Patented Feb. 4, 1958

2,822,428

VARIABLE GAP MAGNETIC TAPE HEAD

John F. Wood, Buchanan, Mich., assignor to Electro-Voice, Incorporated, Buchanan, Mich.

Application July 13, 1954, Serial No. 443,003

6 Claims. (Cl. 179—100.2)

The present invention relates to a variable gap magnetic tape head which is relatively simple in construction and capable of being produced by mass production methods.

In the past magnetic tape heads for recording and reproducing magnetized tape generally have had the gap fixed because of the difficulty encountered in manufacture. It, of course, is known that a magnetic tape head with an adjustable gap would be a desirable structure, but the extreme sensitivity accompanying such adjustment and the complexity of associated parts heretofore has prevented commercial realization of such type of head.

If a magnetized tape is moved across the magnetic gap in a tape head, there will be induced a voltage in the coil of the tape head which is proportional to the time rate of change of magnetic flux. At frequencies having wave lengths long relative to the gap length, the output is dependent upon the gap length, the number of turns on the coil of the tape head and the magnetic efficiency. Thus, for a maximum sensitivity, a large gap would be desirable. However, there are some conditions subsequently to be described which modify this statement.

While the large gap is desirable from a sensitivity standpoint, a small gap is desirable in order to obtain a maximum high frequency response. The tolerances permissible in the gap of a magnetic tape head are extremely small, and hence in the past it has been found that good uniformity could not be obtained economically. Accordingly, it is the purpose of the present invention to provide a structure employing an adjustable gap which is adapted to conventional mass production methods to produce the right compromise of output and response characteristics, consistent with a high degree of uniformity.

It, therefore, is an object of the present invention to provide an improved magnetic tape head for recording or reproducing sound.

Another object of the invention is to provide an improved construction of a magnetic tape head to facilitate manufacture thereof.

A still further object of the invention is to provide an improved magnetic tape head having an adjustable magnetic gap.

Other and further objects of the invention subsequently will become apparent when taken in conjunction with the accompanying drawing and the description thereof, wherein.

Figure 1:
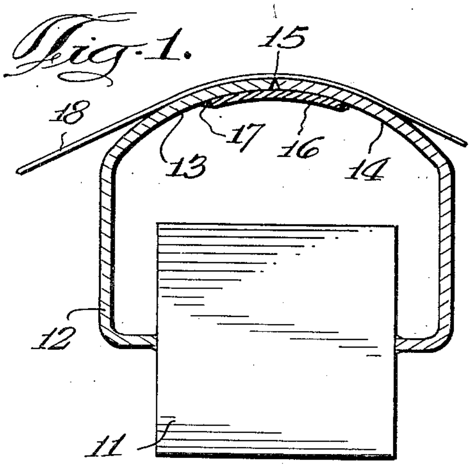
Figure 1 is a plan view partially in cross-section of a magnetic tape head.

Reference now may be had to Figure 1 wherein there is shown a magnetic tape head having a coil 11 carried by a magnetic structure 12 having arcuate pole pieces 13 and 14. The pole piece portions have a magnetic gap 15 which is held constant by the application of a non-magnetic metal strip 16 on the rear side thereof. The strip 16 is suitably bonded to the extremities of the pole portions 13 and 14, usually by silver soldering. While silver soldering is the usual method of applying the retaining strip 16, fillets 17 have been shown to illustrate brazing or other bonding for clarity in the disclosure. A conventional magnetizable tape 18 is shown passing across the magnetic gap 15.

The motion of the magnetizable tape when recording takes place is accompanied by an induced magnetic force at the gap 15 which imparts a degree of magnetization through each incremental length of the tape 18. When the tape 18 thus magnetized is again moved across the gap 15 for reproduction of sound, the magnetized tape changes the degree of magnetization across the gap 15 thereby inducing a voltage into the coil 11 proportional to the time rate of change of magnetic flux. While for maximum sensitivity of reproduction, a large gap 15 is desirable, there are some frequencies where this is not desirable. At some frequency the full wave length of the recorded signal at a given tape speed would coincide with the dimensions of the gap 15. Thus the magnetomotive force across the gap 15 would theoretically drop to zero, and thus the frequency response curve would show a sharp drop with other sharp drops occurring as multiples of this wave length occur with increasing frequency. This has been illustrated by the graphical representation in Figure 2, wherein the drops A and B are such conditions where the full wave length of the recorded signal produces a greatly reduced magnetomotive force. In order to have a smoother response characteristic than that shown in Figure 2, it is necessary to use a smaller gap. Thus a compromise must be made between reasonable sensitivity and the best possible high frequency response characteristic. In structure such as that illustrated in Figure 1, the compromise gap spacing in common usage today ranges from .00025 to .0005 inch for a reproducing or playback head. It might be mentioned that the gap spacing on a tape head used only for recording is somewhat less critical than on reproducing heads due to edge gap effects and a less critical demand for a high overall efficiency.

From the foregoing, it will be appreciated that the parameters for the magnetic gap are somewhat more critical for a reproducing tape head than for a recording tape head. Accordingly the present invention will be described with particular reference to reproduction, although the principles disclosed and the constructions employed are equally applicable to recording tape heads.

Figures 2, 3, 5:
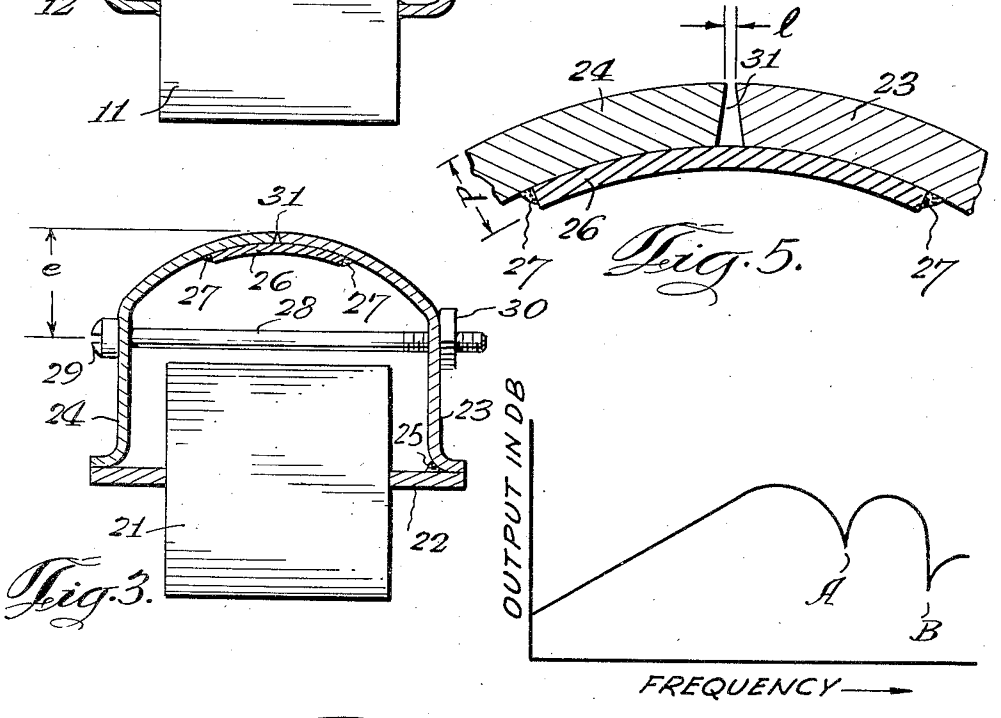
Figure 2 is a graphical representation explanatory of the operation and the purposes of the invention.
Figure 3 is a plan view partially in cross-section of one embodiment of the present invention.
Figure 5 is a detailed cross-sectional view of the construction of Figure 3 under different conditions.

Reference now may be had to Figure 3 which shows one embodiment of the present invention wherein a coil 21 is mounted on a core 22. The core 22 has two similar pole pieces 23 and 24. The one pole piece 24 is welded or soldered as indicated by the fillet 25 to the core 22. The pole pieces 23 and 24 have on their inner side a non-magnetic retaining strip 26, which generally is soft soldered to the extremiites of the pole pieces 23 and 24. To indicate that the strip 26 is bonded to the extremities of the pole pieces 23 and 24 there has been shown fillets 27. Through the straight side portions of the pole pieces 24 and 25 there extends a bolt 28 having a head 29 and a nut 30.

Figure 4:
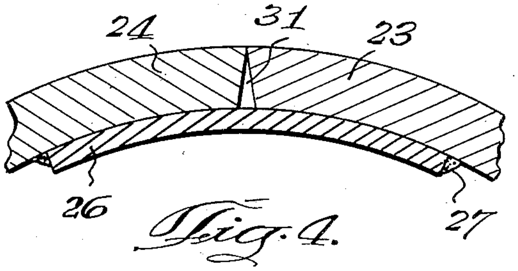
Figure 4 is a detailed cross-sectional view of the consrtuction illustrated in Figure 3.

A greatly enlarged view of the pole pieces 23 and 24 and the retaining strip 26 is shown in Figure 4. It will be noted that the magnetic gap 31 is provided which is so narrow that the extremities of the pole pieces 23 and 24 appear to meet. In the past conventional gap spacing has been by one of several methods. In one method, a non-magnetic metal foil is inserted between the extremities of the pole pieces 23 and 24. Still another method is to plate the pole pieces with non-magnetic material, such as copper, to a thickness sufficient to provide the proper shim.

If force is now applied to the bolt 28 tending to move the lower portion of the pole piece 24 closer to the pole piece 23, the upper portions of the pole pieces 23 and 24 will tend to bow upwardly and outwardly in a manner illustrated in Figure 5. Thus in Figure 5 the magnet gap now has a comparatively large dimension *l*. In an actual device the distance *d* from the outer surface of the pole pieces 23 and 24 to the inner surface of the retaining strip 27 was about .015 inch, while the distance from the bolt 28 to the top of the magnetic pole pieces shown as the dimension *e* is about 2/10 inch. By using the screw having 130 threads per inch, the gap dimensions could readily be changed by .0005 inch. Since the pole pieces have a considerable compliance and the retaining strip 26 has stiffness, actual motion produced at the gap 31 would be much less than this amount.

It will readily be appreciated that with such a simple means for accurately determining the magnetic gap 31 as illustrated in Figure 3, it is possible to set up a production line where these devices may be tested and adjusted and a uniformity obtained which not only is comparable to prior fixed methods, but may even succeed the uniformity heretofore achieved.

Figure 6:
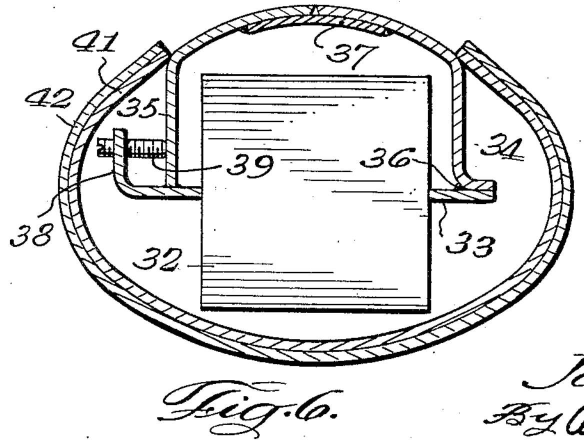
Figure 6 is a plan view partially in cross-section of still another embodiment of the present invention.

In Figure 6 there is shown still another embodiment of the present invention wherein the coil 32 is mounted on the core 33 having two similar pole pieces 34 and 35. The pole piece 34 is welded or soldered as indicated by the fillet 36 to the core 33. A hinge or retaining strip of non-magnetic material 37 is secured to the extremities of the pole pieces 34 and 35. One extremity 38 of the core 33 is bent upwardly and provided with a threaded aperture in which is positioned a set screw 39. The set screw will provide a greater mechanical advantage for adjusting the gap than would the bolt 28 and the nut 30. The entire gap, with the exception of the effective portions of the pole pieces 34 and 35, may be enclosed by a cover composed of two strips of metal 41 and 42 to provide electrostatic and electromagnetic shielding.

While for the purpose of describing and illustrating the present invention, certain preferred embodiments have been illustrated in the drawing, it is to be understood that the invention is not to be limited thereby since such other embodiments are contemplated as may be commensurate with the spirit and scope of the invention set forth in the accompanying claims.

I claim as my invention:

1. A magnetic tape head comprising a magnetic structure having a core portion and two arcuate pole pieces, a coil mounted on said core, one of said pole pieces being fixed to said core, the other of said pole pieces being positioned in abutment to said core and forming a magnetic gap with the first pole piece, said pole pieces being aligned longitudinally, a non-magnetic member secured to each of said pole pieces in the proximity of the magnetic gap, and mechanical means for varying the effectiveness of the magnetic gap by applying a force transverse to the longitudinal axis of the pole pieces.

2. A magnetic tape head comprising a magnetic structure having a core portion and two arcuate pole pieces, a coil mounted on said core, one of said pole pieces being fixed to said core, the other of said pole pieces being positioned in abutment to said core and adjacent the first pole piece to form therewith a magnetic gap, a non-magnetic strip secured to the inner end portions of each of said pole pieces adjacent the magnetic gap, and mechanical means for varying the magnetic gap by applying a force tending to bend said non-magnetic member at said gap.

3. A magnetic tape head comprising a coil mounted on a core, a pair of arcuate pole pieces, one of said pole pieces having one extremity fixed to said core, the other of said pole pieces abutting said core and having an end adjacent the end of said first pole piece, an arcuate non-magnetic strip bonded to the end portions of said arcuate pole pieces, said pole pieces forming a magnetic gap having a configuration which has a greater dimension on its inner side adjacent said non-magnetic strip, and mechanical means for applying a force to said pole pieces tending to bend said non-magnetic strip.

4. A magnetic tape head having two arcuate shaped pole pieces arranged to form a magnetic circuit having a magnetic gap, a non-magnetic guide strip extending across said gap and being bonded to the inner surfaces of said pole pieces, each of said pole pieces having ends tapered inwardly toward said guide strip, and screw means for applying a force tending to bow outwardly said pole pieces at said magnetic gap.

5. A magnetic tape head having two pole pieces having straight side portions and arcuate shaped pole tips arranged to form a magnetic circuit having a magnetic gap, a non-magnetic guide strip extending across said gap and being bonded to the inner surfaces of said pole tips, each of said pole tips having ends tapered inwardly toward said guide strip, and screw means for applying a force to the side portions of said pole pieces tending to bow outwardly said pole tips at said magnetic gap.

6. A magnetic tape head having two pole pieces having straight side portions and arcuate shaped pole tips arranged to form a magnetic circuit having a magnetic gap, a non-magnetic guide strip extending across said gap and being bonded to the inner surfaces of said pole tips, each of said pole tips having ends tapered inwardly toward said guide strip, screw means for applying a force to the side portions of said pole pieces tending to bow outwardly said pole tips at said magnetic gap, and electromagnetic and electrostatic shielding means surrounding all but the arcuate portions of said pole tips.

References Cited in the file of this patent

UNITED STATES PATENTS 2,523,576 Kornei ---------------- Sept. 26, 1950